United States Patent [19]

Keck

[11] 3,872,183

[45] Mar. 18, 1975

[54] COPOLYESTER RESIN CONTAINING ANION ATTRACTIVE GROUPS

[75] Inventor: Max H. Keck, Cuyahoga Falls, Ohio

[73] Assignee: The Goodyear Tire & Rubber Company, Akron, Ohio

[22] Filed: July 2, 1973

[21] Appl. No.: 375,573

[52] U.S. Cl. ............... 260/860, 8/4, 8/179, 8/DIG. 4, 260/75 N
[51] Int. Cl. ............................ C08g 39/10
[58] Field of Search ..... 260/860, 75 N; 8/4, DIG. 4, 8/179

[56] References Cited
UNITED STATES PATENTS

| | | | |
|---|---|---|---|
| 2,647,104 | 7/1953 | Shivers, Jr. | 260/75 |
| 2,739,958 | 3/1956 | Lincoln et al. | 260/75 |
| 2,921,828 | 1/1960 | Caldwell | 8/168 |
| 3,551,521 | 12/1970 | Thomas | 260/45.9 |
| 3,624,181 | 11/1971 | Munakata et al. | 260/860 |

FOREIGN PATENTS OR APPLICATIONS 990,579  4/1965  Great Britain

Primary Examiner—Morris Liebman
Assistant Examiner—T. Pertilla
Attorney, Agent, or Firm—F. W. Brunner; J. M. Wallace, Jr.

[57] ABSTRACT

Copolyesters containing monohydroxyamine salts of oxalic acid or dihydroxyamine salts of organic aliphatic dicarboxylic acids in which the carboxyl groups are separated by at least two carbon atoms can be formed into fibers that dye to deep shades with acid type dyes. From about 1 to about 15 mol percent of the amine salt is used based on the total mols of acid units in the polyester exclusive of the acid in the amine salt itself. The invention encompasses random copolyesters as well as block copolyesters, both of which have improved anionic dyeability.

Fibers of such copolyesters can be dyed to deep shades in solvents such as chlorobenzene or in strong acetic acid solutions. Dyeing can also be accomplished in aqueous dye solutions with or without the use of pressure. Dyeing in acidic medium gives excellent results.

30 Claims, No Drawings

COPOLYESTER RESIN CONTAINING ANION ATTRACTIVE GROUPS

This invention relates to linear thermoplastic copolyester resins containing anion attractive groups, a method of making the copolyester resins, to products prepared from the copolyester resins, and especially to anionically dyeable and dyed fibers and films of the resins.

According to the prior art anion attractive groups can be incorporated into polyester molecules through a functional group capable of forming ester or amide linkages. Thus an amino compound containing reactive free carboxyl or reactive free hydroxy groups could be added to polyester forming reactants and reacted to incorporate the amino compound in the polymer by the formation of ester linkages. Such polymers could be formed into fibers, but generally the fibers did not have good thermal or ultraviolet stability and had poor physical properties. Surprisingly, anionic dyeability was not greatly improved. Some improvement in anionic dyeability of these polymers was obtained by incorporating additionally some groups that retained amorphous character, such as polyether groups. However, such groups further reduced the thermal stability and ultraviolet stability of the products containing them and commercially acceptable products were not obtained.

Now, in contrast to such prior art, it has been found that when the anion attractive groups incorporated in the polyester molecules have associative properties and interaction between the anion attractive units in the polyester molecules is attained, the polymeric polyester resin has improved receptivity for anionic dyes. Associative properties and interactions between anion attractive groups are obtained by incorporation of amine salts in the polymer chain rather than the amine so that the polyester molecules are, in effect, opened up, allowing penetration or migration of anion containing molecules (such as anionic or acid type dyes) into the polymer with the result that the polyesters have superior anionic dyeability.

According to the invention anion attractive groups having associative properties such as monohydroxyamine salts of oxalic acid and dihydroxyamine salts of organic dicarboxylic acids in which the carboxyl groups are separated by at least two carbon atoms can be incorporated in polyester resin molecules to form modified resins that can be readily dyed to deep shades with acid type dyes. Generally a sufficient amount of the amine salt is used to provide from about 1 to about 15 mol percent of amine units based on the total mols of acid units in the polyester excelusive of the acid units in the amine salt itself.

Representative examples of monoalkanolamines that can be used to form oxalate salts useful in the invention are amines of the general formula

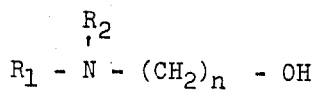

where $R_1$ is a radical selected from the group consisting of alkyl, cycloalkyl, aryl, aralkyl or pyridyl, $R_2$ is hydrogen or a radical selected from the group consisting of alkyl, cycloalkyl, aralkyl or pyridyl and n is an integer having a value of from 2 to 10. Representative examples of the amines are 2-cyclohexylamino-1-ethanol, 2(-N-ethylanilino)-1-ethanol, N-ethyl-N-benzyl ethanolamine, 3-diethylamino-1-propanol, 3-diethylamino-2,2-dimethyl-1-propanol, 3-(2-pyridyl)-1-propanol, N-dibutyl glycolamine, 4-diethylamino-1-butanol, β-(diethyl-aminoethoxy) ethanol, 3-(3-pyridyl methylamino)-1-propanol, 2-[2-(p-tolyloxy)-ethylamino] ethanol, N-ethyl-ethanolamine, N-ethyl-N-cyclohexyl-1-ethanolamine, N-ethyl-N-phenyl-1-ethanolamine, N-ethyl-N-tolyl-1-ethanolamine, N,N-dicyclohexyl-1-ethanolamine, N-cyclohexyl-N-phenyl-1-ethanolamine, N-cyclohexyl, N-tolyl-1-ethanolamine, N-cyclohexyl-N-benzyl-1-ethanolamine, N-phenyl-N-benzyl-1-ethanolamine, N-phenyl-N 2-pyridyl-1-ethanolamine, N-tolyl-N-benzyl-1-ethanolamine, N-tolyl-N-2-pyridylaminol-ethanol, N-benzyl-1-ethanolamine, N,N-dibenzylamino-1-ethanol, N-benzyl-N-2-pyridylamino-1-ethanol and N,N-di(2-pyridyl) amino-1-ethanol.

Representative examples of amines that can be used to form salts of organic dicarboxylic acids in which the carboxyl groups are separated by at least two carbon atoms are amines having a general formula selected from the group consisting of

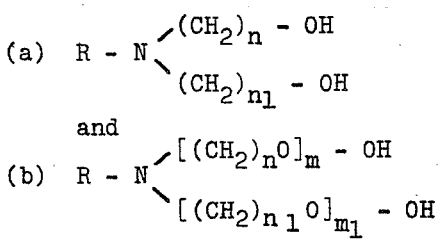

wherein R is a radical selected from the group consisting of alkyl, aralkyl, cycloalkyl, alkoxy alkyl, aryloxy alkyl, aralkoxy alkyl, alkoxy aryl, aryloxy aryl, alkaryloxy aryl, alkoxy aralkyl, aryloxy aralkyl, aralkoxy aralkyl and pyridyl radicals, $n$ and $n_1$ are integers from 2 to 10 and $m$ and $m_1$ are integers from 0 to 20. The R radicals can contain substituents such as alkyl ether, cycloalkyl ether and aryl ether groups, for example, ethoxy, propoxy, cyclohexoxy and phenoxy groups.

Representative examples of alkyl radicals are radicals such as methyl, ethyl, propyl, butyl, pentyl, hexyl, heptyl, octyl, stearyl; aralkyl radicals are benzy, phenethyl; cycloalkyl radicals are cyclohexyl, cyclododecyl; alkoxy alkyl radicals are methoxy ethyl, ethoxy ethyl; aryloxy alkyl radicals are phenoxy ethyl, phenoxy butyl; aralkoxy alkyl radicals are benxyloxy methyl and benzyloxy ethyl.

Representative examples of amines of the class are N-substituted dialkanolamines such as the N-substituted diethanolamines, N-substituted dipropanolamines, N-substituted dibutanolamines and N-substituted dihexanolamines, N-substituted dipentanolamines, N-substituted dioctanolamines, N-substituted dinonanolamines and N-substituted didodecanolamines.

Representative examples of amines are amines such as N-methyl diethanolamine, N-ethyl diethanolamine, N-propyl diethanolamine, N-butyl diethanolamine, N-hexyl diethanolamine, N-heptyl diethanolamine, N-octyl diethanolamine, N-stearyl diethanolamine, N-benzyl diethanolamine, N-phenethyl diethanolamine, N-cyclohexyl diethanolamine, N-cyclododecyl diethanolamine, N-2-methoxyethyl diethanolamine, N-2- ethoxyethyl diethanolamine, N-2-phenoxyethyl diethanolamine, N-2-phenoxybutyl diethanolamine, N-2-benzyloxymethyl diethanolamine, N-2-benzyloxyethyl diethanolamine, N-2-ethoxyphenyl diethanolamine, N-p-ethoxybenzyl diethanolamine, p-phenoxyphenyl diethanolamine, p-phenoxybenzyl diethanolamine, N-benzyloxyphenyl diethanolamine. Additional representative examples are amines of the above type wherein other amine structures such as dipropanolamine, dibutanolamine, dipentanolamine, dihexanolamine, diheptanolamine, dioctanolamine, dinonanolamine and didodecanolamine are in place of diethanolamine.

The salts can be salts of various dicarboxylic acids in which the carboxyl groups are separated by at least two carbon atoms. Representative examples of such acids are succinic, glutaric, adipic, azelaic, pimelic and dodecandioic acid. Also, salts of mineral acids such as hydrochloric acid can be used.

The copolymers of the invention may be considered as modified polyesters. Thus the basic structures of the copolymers are fiber forming polyesters or copolyesters such as polyalkylene terephthalate, polycycloalkylene terephthalate, polyalkylene naphthalate, polycycloalkylene naphthalate, polyalkylene terephthalate copolyesters containing at least 80 mol percent of polyalkylene terephthalate and polyalkylene naphthalate copolyesters containing at least 80 mol percent of polyalkylene naphthalate. Representative examples of such polyesters are polyethylene terephthalate, polycyclohexylene dimethylene terephthalate, polyethylene naphthalate, polycyclohexylene dimethylene naphthalate, ethylene terephthalate copolyesters containing at least 80 mol percent of ethylene terephthalate, ethylene terephthalate ethylene aliphatic dicarboxylate copolyesters containing at least 80 mol percent of ethylene terephthalate and ethylene naphthalate-ethylene aliphatic dicarboxylate copolyesters containing at least 80 mol percent of ethylene naphthalate.

The resins can be derived from dicarboxylic acids or ester forming derivatives thereof and glycols. Representative exmples of dicarboxylic acids from which the resins can be derived are aromatic dicarboxylic acids such as terephthalic acid, isophthalic acid and the naphthalic acids; aliphatic dicarboxylic acids such as adipic acid, sebacic acid and azelaic acid. The resins can be made from various glycols including ethylene glycol, the propylene glycols, tetramethylene glycol, pentamethylene glycol and 1,4 cyclohexane dimethanol. Ethylene glycol is preferred because of its low cost and ready availability.

The invention is illustrated by the following examples in which parts and percentages are by weight unless otherwise indicated.

Preparation of the Amine Salt

The oxalate and succinate salts of the amino alcohols used in this study were prepared by dissolving the amine and the acid separately in methanol or in anhydrous ethanol and then mixing these alcoholic solutions. Removal of the alcohol solvent under vacuum yielded the desired salt. The hydrochloride salts were prepared by bubbling the stoichiometric amount of gaseous hydrogen chloride into a solution of the amine. These salts are characterized in Table I.

EXAMPLE 1

Preparation of the Oxalate Salt of N-2-(Hydroxyethyl) Cyclohexylamine

In a small beaker 14.3 grams (0.1 mol) of N-2-(hydroxyethyl) cyclohexylamine was dissolved in 50 milliliters of anhydrous ethanol. In another beaker 12.6 grams (0.1 mol) of oxalic acid .2H$_2$O was dissolved in 50 milliliters of anhydrous ethanol. The ethanolic solution of the amine was heated to 70° C. and was added, slowly with stirring, to the solution of oxalic acid which was also at 70° C. Stirring was continued for 10 minutes after which the ethanol solvent was removed under vacuum in a rotoevaporator. There was recovered 24.5 grams of white salt. It had a melting point of 135° C.

EXAMPLE 2

Preparation of the Oxalate Salt of N-2-(Hydroxyethyl) Cyclohexylamine 175 grams of oxalic acid .2H$_2$O (1.22 mols) was dissolved in 500 milliliters of methyl alcohol. 151.5 grams (1.22 mols) of the N-2(hydroxyethyl) cyclohexylamine at 60° C. was slowly poured into the methanolic solution of oxalic acid with stirring. The reaction mixture was stirred at 55° C. for about one hour and was then allowed to cool to room temperature. On standing overnight a large deposit of crystals was obtained. The yield of dried crystals was 207 grams. The melting point was 135° C. An additional 50 grams of crystals were recovered from the mother liquor.

EXAMPLE 3

Preparation of the Pimelic Acid Salt of Tertiary Butyl Diethanolamine

A 16 gram quantity (0.1 mol) of pimelic acid was dissolved in 100 milliliters of warm methanol. To the stirred solution was added dropwise 16.1 grams (0.10 mol) of tertiary butyl diethanolamine. When the addition was completed the methanol was removed by vacuum distillation. The pimelic acid salt of the amine was a pale yellow viscous oil.

EXAMPLE 4

Preparation of the Succinic Acid Salt of the Monododecyl Ether of Triethanolamine A 21 gram (0.066 mol) quantity of the monododecyl ether of triethanolamine was diluted with 25 milliliters of anhydrous methanol. A hot solution of 7.788 grams (0.066 mol) of succinic acid in 50 milliliters of anhydrous methanol was added, with stirring, to the amine solution. The methanol was then removed under vacuum to yield a viscous pale yellow oil which was the succinate salt of the amine.

EXAMPLE 5

Preparation of the Succinate Salt of Tertiary Butyl Diethanolamine

A 367 gram (3.11 mols) quantity of succinic acid was dissolved in 1,500 milliliters of boiling methanol. To this solution was added, with stirring, 502 grams (3.11 mols) of tertiary butyl diethanolamine. The mixture was stirred until it had cooled to room temperature after which the methanol was distilled off under vacuum. The residue left after the removal of the methanol was viscous oil which gradually crystallized. Recrystallization from 90:10 by volume mixture of methyl ethyl ketone: ethanol yielded white crystals melting at 90° to 92° C.

Preparation of Polymer

The polymers were prepared by ester interchange and condensation. Dimethyl terephthalate and ethylene glycol were reacted using zinc acetate as ester interchange catalyst. The amine salt was added after the metholysis was complete and the mixture polycondensed at elevated temperature and reduced pressure. Illustrative examples are set out below.

EXAMPLE 6

Preparation of Polymer Containing 8 Mol Percent Succinate Salt of Tertiary Butyl Diethanolamine Into a 5 liter three neck flask were charged 1552 grams of dimethyl terephthalate, 200 grams of Polymeg 1,000 (polytetramethylene glycol ether having a molecular weight of about 1,000 obtained from the Quaker Oats Company), 1144 grams of ethylene glycol, 0.466 gram of $ZnAc_2.2H_2O$ and 0.466 gram of $Sb_2O_3$. This mixture was heated and stirred to raise the temperature from 155° to 225° C. over a four hour period during which a total of 642 milliliters of methanol distilled from the reaction mixture. A 179.2 gram quantity of the succinate salt of tertiary butyl diethanolamine was then added and reacted at 205° C. for 30 minutes. The reaction mixture was then transferred to a stainless steel condensation polymerization vessel. Over an 80 minute period the temperature of the mixture was raised from 195° to 260° C. and simultaneously the pressure was gradually reduced from atmospheric pressure to one Torr. The temperature was raised to 272° C. and held there for 25 minutes while maintaining the pressure at about one Torr. The reactor was then restored to atmospheric pressure by passing nitrogen into the system. The polymer was extruded under slight nitrogen pressure. It had an intrinsic viscosity of 0.602.

EXAMPLE 7

Preparation of Polyester Containing 5 mol Percent Succinate Salt of Tertiary Butyl Diethanolamine Into a 5 liter three neck flask were charged 1,785 grams of dimethyl terephthalate, 1,255 grams of ethylene glycol, 0.535 gram of $ZnAc_2.2H_2O$ and 0.535 gram of $Sb_2O_3$. This mixture was heated and stirred for 4 hours during which time the temperature was raised from 155° to 225° C. A total of 733 milliliters of methanol distilled from the reaction mixture during this four hour period. To the reactor were now added triethylene diphosphite (0.55 gram) stabilizer and 1.3 grams of 2-(3,5-ditertiarybutyl-4-hydroxybenzyl)-1,3-propanediol. After these materials had been stirred in there was added to the reactor a 128.5 gram quantity of the succinic acid salt of tertiary butyl diethanolamine. This reaction mixture was then transferred to a stainless steel polymerization vessel. Over a 60 minute period the reaction temperature was raised from 195° to 247° C. and the pressure was reduced gradually to 2.5 Torr. During the next 60 minute period the pressure was further reduced to 0.5 Torr and the temperature was raised from 247° to 275° C. The reactor was then restored to atmospheric pressure by passing nitrogen gas into the system. The polymer was extruded from the reactor under slight nitorgen pressure. The intrinsic viscosity was found to be 0.579.

The polymer of Example 7 exhibited low dye uptake in the standard aqueous dye medium. However, when dyed using glacial acetic acid or 80/20 glacial acetic acid/water mixture as the solvent system for the dye, the dye uptake with Acid Red 151, Acid Orange 7 and Acid Blue 40 was found to be generally equivalent to that obtained with nylon using standard aqueous dyeing conditions.

The dyeing procedure for dyeing in acetic acid dye bath is as follows:

The fabric sample is preconditioned by heating it in an aqueous Triton-X 100 detergent solution at 80° C. Then the sample is washed in hot water and then in cold water.

The dye to be used is dissolved in anhydrous acetic acid. The temperature of the solution is adjusted to 50° C. The washed fabric sample is inserted in the acetic acid dye solution and the temperature raised to 100° C. over a period of one hour. The solution containing the fabric sample is maintained at this temperature for 30 minutes. The fabric sample is then removed from the solution and washed, first with hot water and then with cold water. It is then rinsed with sodium bicarbonate solution to neutralize any acid remaining on the fabric.

In the above procedure the acetic acid used was anhydrous. If desired, it can be diluted with water down to about 80 percent acetic acid content. Concentrations below about 80 percent acetic acid do not give results as good as concentrations of about 80 percent and higher.

Fibers made from the polymer had a tenacity of 3.11 grams/denier. Fibers which had been treated with glacial acetic acid under simulated dyeing conditions (45 minutes at 75° C.) had a tenacity of 3.16 grams/denier, indicating that the acetic acid treatment was not harmful to fiber properties. The heat stability of this polymer was satisfactory at temperatures as high as 350° F. When dyed under pressure at 130° C. at pH2, using 1.0 percent Charlab S-10-C carrier, excellent dyeability was obtained using the dyes Acid Red 4, Acid Blue 78 and Acid Yellow 175.

EXAMPLE 8

Preparation of Copolymer Containing the Oxalate Salt of N-(2-Hydroxyethyl) Cyclohexylamine Bis hydroxyethyl terephthalate, 0.2046 mol (51.8 grams); Polymeg 1000, 0.0044 mol (4.4 grams); oxalate salt of N-(2-hydroxyethyl) cyclohexylamine, 0.0154 mol (4.15 grams) and $ZnAc_2.2H_2O$ (0.011 gram) and $Sb_2O_3$ (0.011 gram) were charged into a glass reaction tube equipped with a side arm, a nitrogen gas inlet tube and a stirrer. This mixture was heated and stirred for 30 minutes at 200° C., then 15 minutes at 225° C., followed by 15 minutes at 250° C., after which the pressure was gradually reduced to 0.3 Torr over a 30 minute period. When the temperature was raised to 265° C. after 60 minutes at 265° C. and 0.3 Torr the reaction system was restored to atmospheric pressure with nitrogen gas. Fibers were pulled from the molten polymer by touching it with a glass rod and then pulling the rod away. The fibers were drawn to about a 4 to 1 ratio in hot water. The oriented fibers thus obtained were heat set at constant length by treatment with boiling water for 15 minutes. Dyeability was tested for using Alizarin Sky Blue BS and also Acid Red 4 acid dyes dissolved in 95/5 chlorobenzene/acetic acid mixture (volume). The dye solution was prepared by dissolving the dye in the acetic acid and then adding chlorobenzene. Dye pick up was good with both dyes. Under similar dyeing conditions fibers of polyethylene terephthalate picked up only a tint of color.

EXAMPLE 9

Preparation of Polymer Containing 7.5 Mol Percent of the Succinate Salt of the Monododecyl Ether of Triethanolamine

Bis hydroxyethyl terephthalate (47.24 grams); Polymeg 1000 (5 grams); succinate salt of monodecyl ether of triethanolamine (6.1 grams), 0.011 gram of $ZnAc_2 \cdot 2H_2O$ and 0.011 gram of $Sb_2O_3$ were charged into a glass reactor tube equipped with a side arm, a nitrogen gas inlet tube, and a stirrer. This mixture was heated and stirred at 150° C. for 25 minutes. The temperature was then raised to 175° C. and held there for 15 minutes, after which the temperature was raised to 200° C. At this point the pressure in the system was gradually reduced. After 15 minutes the pressure was 20 inches of mercury. The temperature was then raised to 240° C. and during the next 15 minutes the pressure was gradually reduced to 0.25 Torr. After 40 minutes under these conditions the temperature was increased to 250° C. After two hours the reaction was stopped. Fibers were pulled from the melt using the glass rod technique described above. These fibers drawn at 70° C. to about a 4 to 1 draw ratio were heat set at constant length by treatment with boiling water for 15 minutes. Dyeability was then tested for using Alizarin Sky Blue BS dye. Dye pickup was good at a pH of 4 in aqueous medium and was excellent in glacial acetic acid medium.

Polyester of EXAMPLE 6 Dyeing at pH=2

| Acid Dye 2% | pH | *Depth of Shade Compared to Nylon (Nylon = 0) | Lightfastness Rating at 40 Hrs. Example 6 Polyester | Control Nylon |
|---|---|---|---|---|
| Acid Red 266 | 2 | +2.1 | 3–4 | 5 |
| Acid Red 299 | 2 | −3R | 1 | 5 |
| Acid Red 37 | 2 | −8.5 | — | 5 |
| Acid Blue 145 | 2 | −4.2 | — | 5 |
| Acid Yellow 40 | 2 | Duller | — | 5 |
| Acid Green 25 | 2 | −2.1 | — | 5 |

*Depth of Shade numbers are "Color Difference Units" according to the method of Adams and Nickerson described in the AATCC Handbook.

ACID DYEING
pH 4

2% Dye owg (on weight of goods)
40:1 (liquor : goods) ratio

Procedure:
1. Prescour 10 minutes at 80° C. in nonionic detergent.
2. Set dye bath at 40° C. with:
    3% Ammonium Acetate (owg)
    2% Dye
3. Raise to boil in 1 hour.
4. Boil 30 minutes.
5. Add 3% Formic acid (owg) over a 30 minute span.
6. Final pH ≅ 4.

pH 2

2% Dye
Total liquor ratio of 40:1 (liquor:goods)

Procedure:
1. Prescour 10 minutes at 80° C. in nonionic detergent.
2. Set dye bath at 40° C. with:
    10% Glauber salt-anhydrous (owg)
    2% Dye
3. Heat to 70° C.
4. Add $H_2SO_4$ to pH 2
5. Raise to boil.
6. Boil 1½ hours.
7. Rinse in hot and then in cold water.
8. Neutralize in sodium bicarbonate.

TABLE I
POLYMERS CONTAINING AMINO-ALCOHOL SALTS

| Amino-Alcohol Salt | Mol % Salt in the Polymer | Mol % Polyether in the Polymer | IV$^a$ | ° C. MP | Dyeability in: Water | Chlorobenzene | Acetic Acid |
|---|---|---|---|---|---|---|---|
| Tertiarybutyl diethanolamine succinate | 5 | 0 | 0.660 | 241 | P | G | — |
| Tertiarybutyl diethanolamine succinate | 4 | G-600 * | 0.662 | — | P | G | — |
| Tertiarybutyl diethanolamine succinate | 8 | 2.5 Polymeg 1000 ** | 0.602 | 230 | F | G | G |
| Tertiarybutyl diethanolamine oxalate | 6 | G-600 | Cross-linked | — | — | — | — |
| Tertiarybutyl diethanolamine hydrochloride | 6 | 2 Polymeg 1000 | 0.551 | — | F | G | — |
| Cyclohexyl diethanolamine succinate | 7 | 2.5 Polymeg 1000 | 0.500 | — | F | — | G |
| Triethanolamine monododecyl ether succinic acid salt | 7 | 2.5 Polymeg 1000 | 0.432 | — | F | — | G |
| Cyclohexyl ethanolamine oxalate | 7 | 2 Polymeg 1000 | 0.500 | — | P | G | — |
| Cyclohexyl ethanolamine oxalate | 10 | 2 G-600 | 0.542 | 247 | P | G | — |
| Cyclohexyl β-hydroxy phenethyl-amine oxalate | 7 | 2 Polymeg 1000 | 0.447 | — | — | — | P | — |

* G-600 = $HC \overset{O}{\underset{H}{-}} C H - CH_2 - (OCH_2CH_2)_{10} - OCH_3$
** Polymeg 1000 = Polytetramethylene glycol ether of average molecular weight 1000

F – Fair
G – Good
P – Poor

Dye uptake was generally satisfactory under these conditions.

| Polyester of EXAMPLE 6 Heat Stability | |
|---|---|
| Original | IV 10 Mins. at 300° F. |
| 0.510 | 0.531 |
| 0.474 | 0.481 |

Duplicate samples show no drop in intrinsic viscosity at 300° F.

Thermal stability of each of the samples was determined as follows: A sample of the resin was ground to pass a 20 mesh screen and dried for 16 hours at 135° C. and 1 millimeter of mercury pressure. The dried sample was placed in a Petri dish and aged at 280° C. in an electrically heated oven in the presence of air for one day. Intrinsic viscosity of the sample was then determined. The change in intrinsic viscosity on aging in this manner is shown in the Table above.

Intrinsic viscosity is defined as limit $\ln(\eta)_r/C$ as C approaches zero in which $\eta_r$ is the viscosity of a dilute solution of the resin in a 60/40 phenol/tetrachloroethane solvent mixture divided by the viscosity of the solvent mixture in the same units at the same temperature. For the intrinsic viscosities reported in this specification a sufficient sample of each resin was dissolved in the solvent mixture to form a solution having a resin concentration of approximately 0.4 gram per 100 cubic centimeters of solution. The time of flow of each solution and of the solvent was measured in a No. 1 Ubbelohde Viscosimeter at 30.0° C. and these times were used in the respective viscosities in the equation above.

The invention has been illustrated above particularly with respect to random copolymers. The invention also includes block copolymers of the units which also can comprise the random copolyesters. Embodiments of the invention illustrating block copolyesters are set out below.

Block copolyesters of this invention are segmented linear copolyesters comprised of randomly occurring first, (A), and second, (B), polyester segments connected through ester linkages. The (A) polyester segment is highly crystalline, melting above 200° C., and may be represented by the formula:

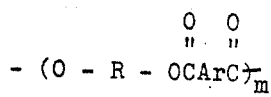

wherein R = $C_2H_4$, $C_3H_6$, $C_4H_8$, or

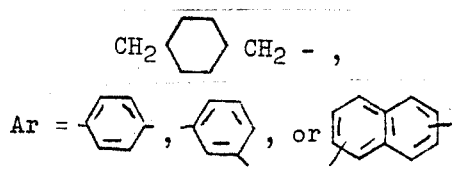

and $m$ = a number from 4 to about 200.

The second or (B) segment is a reaction product of an amine salt of this invention with aliphatic or aromatic dicarboxylic acids or mixtures thereof. Minor amounts of modifying dihydroxy compounds may be incorporated into this amine-containing polyester. Examples of such modifying agents are ethylene, propylene, tetramethylene or neopentyl glycols, and glycol ethers, such as the carbowaxes. This amine-containing polyester segment used generally has an intrinsic viscosity in the range of from about 0.1 to about 0.5 as determined in a 60/40 phenoltetrachloroethane mixed solvent at 30.0° C.

Preparation of a typical block copolyester of the invention is illustrated in the example below.

EXAMPLE 10

| Dimethyl terephthalate | (.031 mol) = 6.01 grams, |
|---|---|
| tert. Bu Diethanolamine-Pimelate Salt | (.0155 mol) = 5.0 grams, |
| Ethylene Glycol | (.0527 mol) = 3.27 grams, and |
| $ZnAc_2 \cdot 2H_2O$ | = 0.0018 gram | were charged into a small glass reaction tube and heated at 140° to 180°C. When evolution of methanol ceased the mixture was polymerized by reacting it at 0.3 Torr for 70 minutes during which time the temperature of the mixture was raised from 200 to 235°C. A light yellow polymer, very viscous at room temperature, was obtained.

A 40 gram portion of a tetramethylene terephthalate polyester having an intrinsic viscosity of 0.306 was added to the reactor containing the amine polymer. The mixture was heated and stirred at 235° to 240°C. to melt the tetramethylene terephthalate polymer. A uniform melt mixture was obtained in about 20 minutes. The two polymer blocks were interlinked by the incremental addition of 3 grams of terephthaloyl bis-N-caprolactam over a 12 minute period. Vacuum was applied briefly to remove the caprolactam evolved by the interlinking reaction. Fine fibers were pulled from the melt, drawn to about a 4:1 ratio, and heat set at constant length in boiling water for 15 minutes. These fibers, dyed aqueously at the boil, at pH 2, dyed to deep shades with Acid Red 4, Acid Blue 78 and Acid Yellow 175 dyes. The lightfastness of these dyed fibers was excellent, no fading of color being observed even after 40 hours in a Color Fade-Ometer.

EXAMPLE 11

Preparation of Polyester Containing the Azelate Salt of Tertiary Butyl Diethanolamine Into a 1 liter, three-necked flask were charged dimethyl terephthalate, 194 grams (1 mol), tertiary butyl diethanolamine.azelate salt, 244.6 grams (0.7 mol), ethylene glycol, 105 grams (1.7 mols), 0.058 gram of $Sb_2O_3$ and 0.58 gram of $ZnAc_2 \cdot 2H_2O$. Then over a five hour period the reaction temperature was raised from 155° to 205°C. A total of 80 milliliters of methanol was evolved. The reaction mixture was then transferred to a one liter glass autoclave. Over a three hour period the temperature was raised from 190° to 220° C. and the pressure was kept in the range of 0.1 to 0.5 Torr. Heating was discontinued at this point and the polymer was allowed to cool to 110° C. while the system was kept under vacuum. The amine-containing polymer was then extruded into a glass container and stored under $N_2$ gas. At room temperature the product was a light yellow extremely viscous liquid. The intrinsic viscosity was 0.116.

EXAMPLE 12

Preparation of an Acid Dyeable Block Copolyester

Into a stainless steel reactor, fitted with a stirrer and a reflux condenser, were charged 1751 grams dimethyl terephthalate, 199 grams dimethyl isophthalate, 1265 grams ethylene glycol, 0.7 gram ZnAc 2H O and 0.489 gram Sb O. This mixture was reacted at 152° to 207° C. over a 2 hour period. 880 milliliters of methanol was evolved. The product remaining in the reactor was a low molecular weight ethylene terephthalateisophthalate copolymer. It was transferred to a stainless steel polymerization vessel. The pressure in the vessel was gradually reduced to .3 Torr over a 70 minute period and the temperature was raised from 216° to 267° C. At that point the intrinsic viscosity of the copolyester was 0.638. The system was restored to atmospheric pressure with $N_2$ gas and 125 grams of the amine polymer of Example 11 was added. The system was again put under vacuum at 260° C. for a 15 minute period during which there was observed a rapid build up of power required to stir the mixture. The system was restored to atmospheric pressure with $N_2$ gas. Then the product which was the block copolymer was extruded from the reactor. The melted copolymer was pale yellow in color. The intrinsic viscosity was 0.713 and the melting point was 227° C. as measured by a Mettler FPI melting point apparatus. The copolymer was spun into yarn, drawn, heat set and then tested for dyeability. Samples of fibers were then dyed aqueously at 120° C. and pH2 for one hour using Acid Red 4, Acid Blue 78 and Acid Yellow 175 dyes. Dye pick up was very good with each of these dyes.

In preparing the block copolyesters the block containing the amine group will usually comprise five or more repeating units and an amount to provide from about 1 mol percent to about 15 mol percent of the final block copolyester of the amine based on the total mols of acid units present in the copolyester will be used. Generally the block containing the amine group will contain from about 10 to 35 repeating units and the amount used will preferably be sufficient to provide about 5 to 10 mol percent of the amine based on the total mols of acid in the final copolyester.

The remainder of the block copolyester comprises blocks of a high melting polyester or copolyester of units of a glycol and units of an aromatic dicarboxylic acid. The glycol from which the unit is derived can be a polymethylene glycol, cycloalkylene glycol or other glycol that forms high melting polyester with aromatic dicarboxylic acids. Representative examples of glycols are ethylene glycol, propylene glycol, tetramethylene glycol and cyclohexane dimethanol. The acid from which the acid unit is derived is an aromatic dicarboxylic acid. Representative examples are terephthalic acid, isophthalic acid, naphthalene dicarboxylic acid and mixtures of these acids as well as mixtures with up to 20 mol percent of another acid such as adipic acid, pimelic acid, sebacic acid and azelaic acid.

The block copolyesters of the invention are condensed to an intrinsic viscosity of at least 0.4 and generally at least 0.5. Copolyesters having an intrinsic viscosity of 0.6 provide fibers having good physical properties and stability.

In the practice of this invention the preparation of glycol esters is in general carried out in accordance with the usual known techniques. They may be suitably prepared by ester interchange, esterification or other method. The ester interchange is preferably carried out in the absence of oxygen, generally in an atmosphere of an inert gas such as nitrogen in order to lessen darkening and to make it possible to attain a high molecular weight pale or colorless polyester product from the glycol ester. Thus the ester interchange reaction is conducted at temperatures of from about 190° C. to 250° C. under a nitrogen atmosphere and atmospheric pressure. The subsequent condensation polymerization is carried out at 240° to 280° C. under reduced pressure of 0.01 to 0.5 millimeter of mercury pressure.

The amount of catalyst such as zinc acetate used in the ester interchange may be varied over wide concentrations. As is usual with catalysts the amount will ordinarily be very small. As a general rule the amount will be within the range of from 0.001 to 0.100 weight percent based on the weight of the bis ester of dicarboxylic acid to give a satisfactory reaction rate and a product of suitable color.

The invention has been illustrated preparing the polymers with zinc acetate as catalyst. Other ester interchange catalysts can be used. Representative examples of such catalysts are litharge, sodium methylate, sodium borate, cadmium acetate, barium acetate and lanthanum acetate. Manganese catalyst seems to cause darkening of the polymer so it is preferred not to use a manganese catalyst.

The glycol esters can also be prepared by direct esterification of the glycol with the acid or other suitable material if desired. In the esterification it is preferred to react the glycol and the acid under elevated pressure in the presence of low molecular weight polyester.

The condensation step of preparing the polyesters has been illustrated using antimony trioxide as catalyst. Other condensation catalysts such as titanium glycolate, litharge, germanium, tungsten or columbium condensation catalysts can be used in place of the antimony trioxide illustrated.

The condensation reactions are in general carried out in accordance with usual known techniques. Thus the reactions are preferably carried out in the absence of oxygen, generally in an atmosphere of inert gas such as nitrogen or the like in order to lessen darkening. Condensation is carried out under reduced pressure, generally below 10 millimeters of mercury pressure and usually at or below one millimeter of mercury pressure at a temperature in the range of from about 260° C. to 290° C. and preferably in the range of from 265° C. to 280° C. the amount of such catalyst used will generally be small. Amounts in the range of from about 0.001 to 0.1 weight percent based on the bis ester of dicarboxylic acid will be used.

In testing for dyeability of experimental samples the qualitative dyeabilities of the compositions prepared were tested as follows: Fibers were pulled from the melt, hand drawn about 4:1, and then heat set at 100° C. at constant length. Dye uptake was tested in standard aqueous dyebaths, in a 95/5 chlorobenzene-acetic acid mixture, and also in acetic acid alone. The use of acetic acid, either anhydrous or slightly diluted with water, was found to provide much deeper dye uptake than the standard aqueous method. Dyeability in the chlorobenzene-acetic acid solvent method was intermediate between that obtained in the aqueous method and in the acetic acid method.

While certain representative embodiments and details have been shown for the purpose of illustrating the invention it will be apparent to those skilled in this art that various changes and modifications may be made therein without departing from the spirit or scope of the invention.

What I claim is:

1. A thermoplastic polymeric fiber forming polyester resin having the capability of being dyed by anionic dyes which comprises a fiber forming polyester resin derived from dicarboxylic acids or ester forming derivatives thereof and glycols and containing as a part of the polymeric polyester molecules an anion attractive group that has associative properties sufficiently strong that interaction occurs between anion attractive groups of the polymer molecules, said anion attractive group is derived from compounds selected from the group consisting of monohydroxyamine salts of oxalic acid and dihydroxyamine salts of organic dicarboxylic acids in which the carboxyl groups are separated by at least two carbon atoms and, said amine salts are used in amounts to provide from about 1 to about 15 mol percent of amine units based on the total mols of acid units in the polyester exclusive of the acid units in the amine salt.

2. A composition comprising a fiber forming copolyester of (A) units selected from the group consisting of polyalkylene terephthalate, polycycloalkylene terephthalate, polyalkylene naphthalate, polycycloalkylene naphthalate, polyalkylene terephthalate copolyesters containing at least 80 mol percent of polyalkylene terephthalate and polyalkylene naphthalate copolyesters containing at least 80 mol percent of polyalkylene naphthalate and (B) units selected from the group consisting of (I) an amine salt of oxalic acid wherein the amine is a member of the class having the general formula

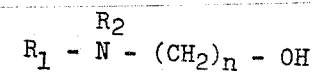

in which $R_1$ is a radical selected from the group consisting of alkyl, cycloalkyl and aryl, $R_2$ is hydrogen and radicals selected from the group consisting of alkyl, cycloalkyl and aralkyl radicals and n is an integer having a value of from 2 to 10 and (II) a tertiary amine salt of an aliphatic organic dicarboxylic acid in which the carboxyl groups are separated by at least two carbon atoms, the amine being selected from amines having a general formula (a) 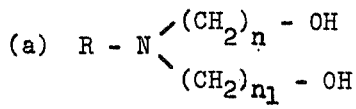

and (b) 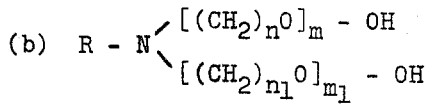

wherein R is a radical selected from the group consisting of alkyl, aralkyl, cycloalkyl, alkoxyalkyl, aryloxy alkyl, aralkoxy alkyl, aralkoxy aryl, alkoxy aralkyl, aryloxy aralkyl, aralkoxy aralkyl and pyridyl radicals, n and $n_1$ are integers from 2 to 10 and m and $m_1$ are from 0 to 20, the amine salt of the dicarboxylic acid comprising from 5 to 95 mol percent of said (B) polymer.

3. A random copolymer comprising (A) units of a polymer selected from the group consisting of polyalkylene terephthalate, polycycloalkylene terephthalate, polyalkylene naphthalate, polycycloalkylene terephthalate, polyalkylene terephthalate copolyesters containing at least 80 mol percent of polyalkylene terephthalate and polyalkylene naphthalate copolyesters containing at least 80 mol percent of polyalkylene naphthalate and (B) units derived from an N-substituted dialkanolamine salt of an aliphatic dicarboxylic acid, said aliphatic dicarboxylic acid having at least two carbon atoms in the chain between the carboxyl groups, in which the (A) units in the copolyester comprise from 99 to 85 percent of the sum of the (A) units and the (B) units, and the (B) units comprise from 1 to 15 percent of said sum.

4. The copolymer of claim 3 in which the (A) units are ethylene terephthalate units.

5. The copolymer of claim 3 in which the (B) units are units derived from an N-substituted dialkanolamine and an aliphatic dicarboxylic acid selected from the group consisting of aliphatic dicarboxylic acids containing from two to 10 carbon atoms between the carboxyl groups of said acids.

6. The copolymer of claim 3 modified with from 0.1 to 1.5 mol percent of a modifying agent selected from the group consisting of ethylene glycol, propylene glycol, tetramethylene glycol, neopentyl glycol and polyglycol ethers.

7. A copolymer of claim 3 in which the copolyester is a random copolyester containing from 1 to 15 mol percent of the amine based on the total mols of acid in the copolyester.

8. A copolymer according to claim 3 in which the units of amine salts are selected from the group consisting of glutaric acid salt of tertiary butyl diethanolamine, succinic acid salt of tertiary butyl diethanolamine, pimelic acid salt of tertiary butyl diethanolamine and azelaic acid salt of tertiary butyl diethanolamine.

9. A composition according to claim 2 wherein the (A) units are ethylene terephthalate and the (B) units are oxalate salt of N-2-(hydroxyethyl) cyclohexylamine.

10. A copolymer according to claim 3 wherein the (A) units are ethylene terephthalate and the (B) units are derived from tertiary butyl diethanolamine glutarate.

11. A copolymer according to claim 3 wherein the (A) units are ethylene terephthalate and the (B) units are derived from tertiary butyl diethanolamine pimelate.

12. A composition according to claim 2 wherein the (A) units are ethylene terephthalate and the (B) units are derived from tertiary butyl diethanolamine azelate.

13. A composition comprising a fiber forming block copolyester in which the blocks are (A) linear crystallizable polyalkylene terephthalate, polycycloalkylene terephthalate, polyalkylene naphthalate, polycycloalkylene naphthalate, a polyalkylene terephthalate or naphthalate copolymer containing at least 80 mol percent of polyalkylene terephthalate or naphthalate, said units having a melting point of at least 200° C. and (B) a copolyester of a glycol and 5 to 95 mol percent of a difunctional tertiary amine salt of an aliphatic organic dicarboxylic acid in which the carboxyl groups are separated by at least two carbon atoms and an aromatic dicarboxylic acid or mixture of said aromatic dicarboxylic acid with up to 65 mol percent of an aliphatic dicarboxylic acid, the amine being selected from amines having the general formula (a) 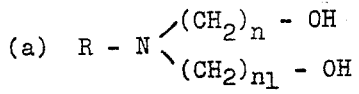

and (b) 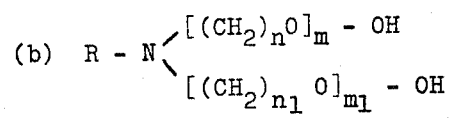

wherein R is a radical selected from the group consisting of alkyl, aralkyl, cycloalkyl and pyridyl radicals, n and $n_1$ are integers from 2 to 10 and m and $m_1$ are integers from 0 to 20, the R's can be substituted by alkoxy, aryloxy and cycloalkoxy, the (A) blocks comprising from 97 to 85 weight percent of the composite block copolyester and the (B) blocks comprising from 3 to 15 weight percent of the composite block copolyester.

14. A block copolyester according to claim 13 in which the (A) units are ethylene terephthalate units and the (B) units are units derived from tertiary butyl diethanolamine glutarate.

15. A block copolyester according to claim 13 in which the (A) units are ethylene terephthalate units and the (B) units are units derived from tertiary butyl diethanolamine pimelate.

16. A block copolyester according to claim 13 in which the (A) units are ethylene terephthalate units and the (B) units are units derived from tertiary butyl diethanolamine azelate.

17. A block copolyester according to claim 13 in which the blocks of the (A) units comprise ethylene terephthalate units and the (B) units comprise blocks of units derived from a glycol, azelaic and tertiary butyl diethanolamine.

18. A block copolyester in which the blocks of (A) units comprise ethylene terephthalate units and the blocks of (B) units comprise blocks of units derived from a glycol and the pimelate salt of a monoether derivative of triethanolamine and a dicarboxylic acid.

19. A block copolyester in which the blocks of (A) units comprise ethylene terephthalate units and the blocks of (B) units comprise blocks of units derived from a glycol and an acid selected from terephthalic acid and isophthalic acid and the azelate salt of a monoether derivative of triethanolamine and a dicarboxylic acid.

20. A composition of claim 9 in which the copolyester is a block copolyester containing from 1 to 15 mol percent of the amine based on the total mols of acid in the copolyester.

21. The process which comprises forming glycol esters of an acid selected from the group consisting of (A) terephthalic acid and naphthalic acid and mixtures of these acids with another acid selected from the group consisting of (B) isophthalic acid and an aliphatic dicarboxylic acid containing from two to 12 carbon atoms, said mixtures comprising at least 80 mol percent of the (A) acid and condensing said glycol esters with an oxalic acid salt of an N-substituted monoalkanolamine, with the elimination of glycol, to form a polymer having an intrinsic viscosity of at least 0.4 measured in a 60/40 tetrachloroethane mixed solvent at 30.0° C.

22. The process which comprises forming glycol esters of an acid selected from the group consisting of (A) terephthalic acid and naphthalic acid and mixtures of these acids with another acid selected from the group consisting of (B) isophthalic acid and an aliphatic dicarboxylic acid containing from two to 12 carbon atoms, said mixtures comprising at least 80 mol percent of the (A) acid and condensing said glycol esters with an amine salt of an acid selected from the group consisting of aliphatic dicarboxylic acids having from 2 to 10 carbon atoms between carboxyl groups, HCl and $H_2SO_4$, the amine of said salt being an N-substituted dialkanolamine, with the elimination of glycol to form a polymer having an intrinsic viscosity of at least 0.4 measured in a 60/40 phenoltetrachloroethane mixed solvent at 30.0° C.

23. The process which comprises forming bis hydroxyethyl terephthalate, adding from about 1 to about 15 mol percent based on the terephthalate present of (I) an amine salt of an organic dicarboxylic acid selected from the group consisting of salts of a monohydroxyamine with oxalic acid and (II) salts of a difunctional amine with an aliphatic organic dicarboxylic acid in which the carboxyl groups of said dicarboxylic acid are separated by at least two carbon atoms, the amine of (I) being selected from amines having a general formula selected from

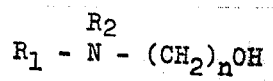

where $R_1$ is a radical selected from the group consisting of alkyl, cycloalkyl or aryl and $R_2$ is hydrogen or a radical selected from the group consisting of alkyl or cycloalkyl and n is an integer having a value of from 2 to 10, the amine of (II) being selected from amines having a general formula selected from the group consisting of

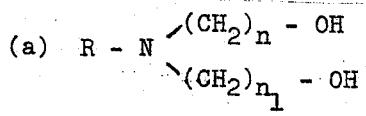

and

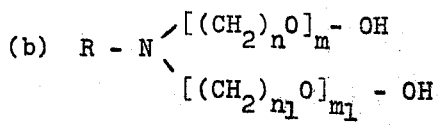

wherein R is a radical selected from the group consisting of alkyl, aralkyl, cycloalkyl and pyridyl radicals, $n$ and $n_1$ are integers from 2 to 10 and $m$ and $m_1$ are integers from 0 to 20 and the acid is selected from the group consisting of hydrogen chloride and organic dicarboxylic acids containing from two to 10 carbon atoms separating the carboxyl groups, heating the mixture under ester interchange conditions, then heating to about 255° C. and reducing the pressure to about one millimeter of mercury pressure until the polymer formed has an intrinsic viscosity of at least 0.4 measured in a 60/40 phenol/tetrachloroethane mixed solvent at 30.0° C.

24. The process of claim 21 wherein the succinic acid salt of tertiary butyl diethanolamine is used as the anion attractive group.

25. The process of claim 21 wherein the pimelic acid salt of tertiary butyl diethanolamine is used as the anion attractive group.

26. The process of claim 22 in which the bis hydroxyethyl terephthalate is formed from dimethyl terephthalate and ethylene glycol by ester interchange in the presence of zinc acetate as catalyst.

27. The process of claim 21 wherein (A) a salt of the monoether derivative of triethanolamine of the general type.

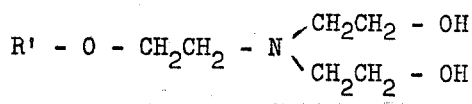

is used as the anionic attractive group in said formula, R' is aralkyl, alkyl, cycloalkyl, alkoxy alkyl, aryloxy alkyl, alkoxy aralkyl, arloxy aralkyl, aralkoxy alkyl and pyridyl and the acid is selected from the group consisting of HCL, $H_2SO_4$ and aliphatic organic dicarboxylic acids containing from two to 10 carbon atoms separating the carboxyl groups, heating the mixture in the presence of a catalyst to a temperature of about 240° C., reducing the pressure to about 1 millimeter of mercury pressure and then (B) condensing the mixture in the presence of an antimony condensation catalyst at a temperature in the range of from about 260° C. to about 280° C. at about 1 millimeter of mercury pressure until the polymer formed has an intrinsic viscosity of at least 0.4 measured in a 60/40 phenol/tetrachloroethane mixed solvent at 30.0° C.

28. The process of claim 22 in which said glycol esters are prepared by ester interchange in the presence of a zinc containing catalyst.

29. The process which comprises forming bis hydroxyethyl terephthalate, adding from about 1 to about 15 mol percent based on the terephthalate units present of an anion attractive group comprising an amine salt of oxalic acid wherein the amine of the general type

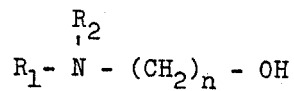

where $R_1$ is a radical selected from the group consisting of alkyl, cycloalkyl or aryl, $R_2$ is hydrogen or a radical selected from the group consisting of alkyl, cycloalkyl or aralkyl, and $n$ is an integer having a value of from 2 to 10, heating the mixture in a reaction system in the presence of a zinc ester interchange catalyst and antimony condensation catalyst to a temperature of about 240° C., then reducing the pressure to about an millimeter of mercury pressure and condensing the mixture at a temperature of from about 260° C. to 280° C. at about one millimeter of mercury pressure until the polymer formed has an intrinsic viscosity of at least 0.4 measured in a 60/40 phenol/tetrachloroethane mixed solvent at 30.0° C.

30. The process of claim 29 wherein the anion attractive groups is a salt of an acid selected from the group consisting of HCL, $H_2SO_4$, and an aliphatic organic dicarboxylic acid containing from two to 10 carbon atoms, separating the carboxyl groups with an N-substituted dialkanolamine including dipropanolamines, dibutanolamines and dihexanolamines which are N-substituted with groups selected from alkyl or cycloalkyl radicals.

* * * * *